(No Model.)
T. S. GILBERT.
CORSET.
No. 332,245. Patented Dec. 15, 1885.
Fig. 1.
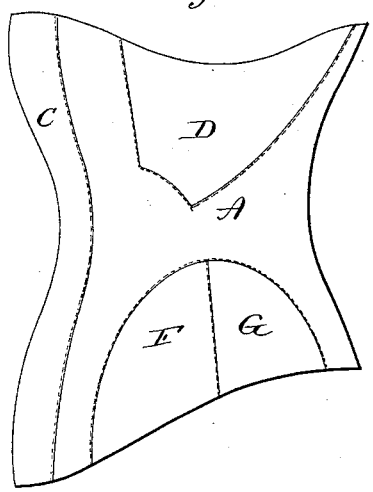
Fig. 3. Fig. 2. Fig. 4.
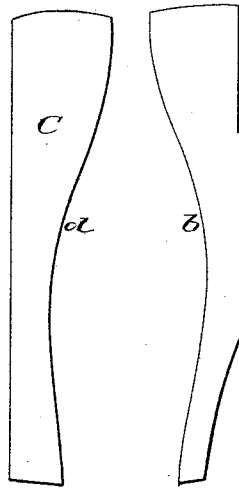 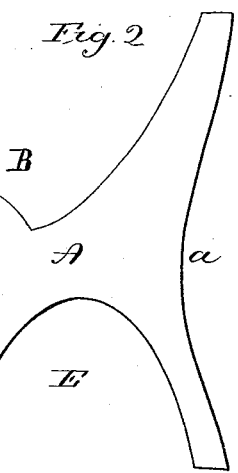 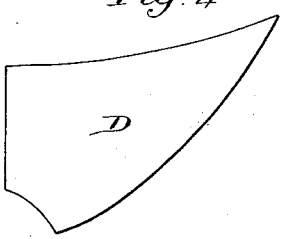
Fig. 5. Fig. 6.
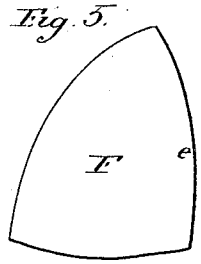 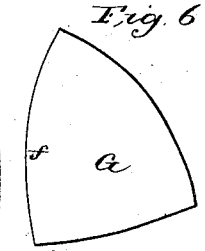
Witnesses.
Thomas S. Gilbert
Inventor
By Atty.

UNITED STATES PATENT OFFICE.

THOMAS S. GILBERT, OF NEW HAVEN, CONNECTICUT, ASSIGNOR TO ALBERT R. COLTON, OF NEW YORK, N. Y.

CORSET.

SPECIFICATION forming part of Letters Patent No. 332,245, dated December 15, 1885.

Application filed April 27, 1885. Serial No. 163,510. (No model.)

*To all whom it may concern:*

Be it known that I, THOMAS S. GILBERT, of New Haven, in the county of New Haven and State of Connecticut, have invented a new Improvement in Corsets; and I do hereby declare the following, when taken in connection with accompanying drawings and the letters of reference marked thereon, to be a full, clear, and exact description of the same, and which said drawings constitute part of this specification, and represent, in—

Figure 1, a side view of the corset complete; Figs. 2, 3, 4, 5, and 6, diagrams showing the cut of the several parts.

This invention relates to an improvement in the cut of corsets, having for its object to cut each half of the corset so that there shall be substantially a continuous fabric around the waist-line, and avoid the introduction of gores at the breast, and yet bring the corset to a perfect fit upon the person; and the invention consists in a corset composed of the pieces in shape and in the manner shown in the accompanying illustration, and hereinafter described.

In illustrating the invention I show but one half the corset, it being understood that the other half is a duplicate, except that one is made right-hand and the other left-hand. The principal piece A, Fig. 2, of the corset is cut from fabric suitable for the purpose, its rear edge, $a$, forming the eyelet-edge of the corset. From this edge it extends to the front edge, $b$, which is the central breast-line. The rear edge is curved inward to give the requisite curve to the back. On the breast-line the upper portion is of convex or outward curve running into a concave curve slightly above the waist-line, which concave curve continues to the bottom, the swell at the top being sufficient for one-half the breast. In the upper edge of the part A a recess, B, is cut, starting from near the rear edge in a concave curve downward and forward to a point on about the hip-line. Near the front, and at about the rear edge of the breast portion, the cut is made downward in substantially a straight line until it approaches the waist-line, where a convex curve is formed downward and backward to intersect the curve cut from the rear downward and forward. In the lower edge a portion is cut out, starting from near the rear upward over the hips and down to near the front edge, as seen in Fig. 2, this figure representing substantially the pattern from which this part of the corset will be cut. The curved part C, Fig. 3, is the busk portion, its forward edge substantially straight, and so that it may receive the busks. Its rear edge is cut to follow the central breast-line, and starting from the upper edge is of convex-curve shape downward and forward, corresponding to the breast portion of the part A, thence downward to the lower edge, as shown, and so that the rear edge, $d$, of the part C, united to the edge $b$ of the part A, will give the requisite fullness for the breast portion.

To fill the recess B, a portion is cut (see Fig. 4) in shape similar to the recess, but in length sufficient to give the requisite fullness to the corset from the breast under the arms to the rear. The edges of the part D are united to the corresponding edges of the recess B and give the requisite shape to the upper portion of the corset.

To fill the hip-recess E in the part A and give the proper swell for the hip, the portion is cut in two parts, F G. (See Figs. 5 and 6.) Their meeting edges $e$ $f$ are of corresponding convex curves, so that when united they will give a curved swell to the portion. The upper edge of the two parts is also of a convex curve, and the length of the two parts such that when introduced into the recess E they will give the requisite swell to the hip portion of the corset.

By the peculiar curved shape of the bottom of the upper recess, B, and the corresponding cut of the portion which is to fill it, and by which a gore-like effect is produced at the waist-line, I obviate difficulties which have existed in corsets having a similarly-cut principal section, but without such gore-like effect, as the gore prevents a direct strain around the body over any considerable extent of flat surface of the material, which in cuts as heretofore made have acted like a band around the body of the wearer, and causing no inconsiderable discomfort.

I claim—

A corset composed of the parts A, C, D, F, and G, the said part A extending in a continuous piece from the rear to the breast-line, the upper portion of the front edge curved to give one-half the swell for the breast, the upper edge having a recess, B, extending in a convex curve from near the rear edge downward and forward to near the waist-line, there intersecting with a convex curve extending downward from the front edge of the recess, and the lower edge of the part A having a recess, E, formed therein, starting in a concave curve from near the rear up over the hip and down toward the front edge, the part C forming the front and having its rear edge cut with the convex swell at the top to form the second half of the breast, the part D cut in shape to fill the recess B and give the requisite swell to the upper portion of the body of the corset, and the parts F G adapted to fill the recess E in the lower portion of the corset, and give the requisite swell thereto, substantially as described.

THOMAS S. GILBERT.

Witnesses:
    JOS. C, EARLE,
    J. H. SHUMWAY.